United States Patent
Bellorado et al.

(10) Patent No.: US 9,013,817 B2
(45) Date of Patent: *Apr. 21, 2015

(54) INTER-TRACK INTERFERENCE CANCELATION FOR SHINGLED MAGNETIC RECORDING

(71) Applicant: SK hynix memory solutions inc., San Jose, CA (US)

(72) Inventors: Jason Bellorado, Santa Clara, CA (US); Marcus Marrow, Santa Clara, CA (US)

(73) Assignee: SK hynix memory solutions inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,468

(22) Filed: Jan. 17, 2014

(65) Prior Publication Data

US 2014/0192434 A1    Jul. 10, 2014

Related U.S. Application Data

(63) Continuation of application No. 13/282,370, filed on Oct. 26, 2011, now Pat. No. 8,665,543.

(60) Provisional application No. 61/408,369, filed on Oct. 29, 2010.

(51) Int. Cl.
| | |
|---|---|
| *G11B 5/09* | (2006.01) |
| *G11B 20/10* | (2006.01) |
| *G11B 5/012* | (2006.01) |
| *G11B 5/00* | (2006.01) |
| *G11B 20/12* | (2006.01) |

(52) U.S. Cl.
CPC .......... *G11B 20/10009* (2013.01); *G11B 5/012* (2013.01); *G11B 20/10046* (2013.01); *G11B 2005/0002* (2013.01); *G11B 2020/1238* (2013.01); *G11B 2020/1292* (2013.01); *G11B 2020/1298* (2013.01); *G11B 2220/2516* (2013.01); *G11B 5/09* (2013.01)

(58) Field of Classification Search
None
See application file for complete search history.

(56) References Cited

U.S. PATENT DOCUMENTS

| | | | | |
|---|---|---|---|---|
| 5,729,514 | A * | 3/1998 | Horigome et al. | 369/47.17 |
| 6,909,566 | B1 * | 6/2005 | Zaitsu et al. | 360/31 |
| 7,126,890 | B2 * | 10/2006 | Learned et al. | 369/44.32 |
| 7,729,071 | B2 * | 6/2010 | Harada | 360/39 |
| 8,014,097 | B1 * | 9/2011 | Sanvido | 360/60 |
| 8,300,339 | B1 * | 10/2012 | Nangare et al. | 360/39 |
| 8,331,053 | B2 * | 12/2012 | Hobbet | 360/60 |
| 8,379,498 | B2 * | 2/2013 | Mathew et al. | 369/47.28 |
| 8,638,522 | B2 * | 1/2014 | Matsuo et al. | 360/77.02 |
| 8,659,846 | B2 * | 2/2014 | Kumar et al. | 360/39 |
| 8,830,613 | B2 * | 9/2014 | Lund et al. | 360/45 |
| 8,854,757 | B2 * | 10/2014 | Mathew et al. | 360/45 |
| 8,862,971 | B1 * | 10/2014 | Chan et al. | 714/795 |
| 2006/0077830 | A1 * | 4/2006 | Kanaoka | 369/47.28 |
| 2009/0135693 | A1 * | 5/2009 | Kim et al. | 369/53.15 |
| 2012/0063022 | A1 * | 3/2012 | Mathew et al. | 360/45 |

* cited by examiner

*Primary Examiner* — Dismery Mercedes
(74) *Attorney, Agent, or Firm* — Van Pelt, Yi & James LLP

(57) ABSTRACT

Inter-track interference cancelation is disclosed, including: receiving an input sequence of samples associated with a track on magnetic storage; using a processor to generate inter-track interference (ITI) data associated with a first side track including by performing a correlation between the input sequence of samples and a sequence of data associated with the first side track.

21 Claims, 13 Drawing Sheets

INTER-TRACK INTERFERENCE CANCELATION FOR SHINGLED MAGNETIC RECORDING

CROSS REFERENCE TO OTHER APPLICATIONS

This application is a continuation of co-pending U.S. patent application Ser. No. 13/282,370, entitled INTER-TRACK INTERFERENCE CANCELATION FOR SHINGLED MAGNETIC RECORDING filed Oct. 26, 2011 which is incorporated herein by reference for all purposes, which claims priority to U.S. Provisional Patent Application No. 61/408,369 entitled INTER-TRACK INTERFERENCE CANCELATION FOR SHINGLED MAGNETIC RECORDING filed Oct. 29, 2010 which is incorporated herein by reference for all purposes.

BACKGROUND OF THE INVENTION

Shingled magnetic recording (SMR) is a technique that increases the capacity of hard-disk drives (HDDs). In contrast to traditional magnetic recording, in which cylinders are written in a non-overlapping manner, SMR groups together a block of N adjacent tracks (referred to as a "shingle"), which are written in-order (i.e., track 0, track 1, ..., track N−1) with a decreased track spacing. As a result, each subsequent track is written close enough to the previously written track such that it will overlap a portion of it. Once a shingle is completely written, tracks within the shingle cannot be modified without re-writing the entire shingle. This approach may be used to increase the number of tracks that may be written to the disk.

However, squeezing the number of tracks written to a disk does not come without some tradeoffs. As tracks are squeezed closer together, reading back a track within a shingle is made difficult because the read-head will, in addition to sensing the magnetic field of the desired track, also sense the magnetic-field due to adjacent tracks. This phenomenon, known as inter-track interference (ITI), becomes a dominant contributor of noise as the track density is increased. It would be desirable to cancel ITI from one or more adjacent tracks in a shingle to improve the overall signal quality.

BRIEF DESCRIPTION OF THE DRAWINGS

Various embodiments of the invention are disclosed in the following detailed description and the accompanying drawings.

FIG. 7 shows an example of adjacent tracks with frequency offsets.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
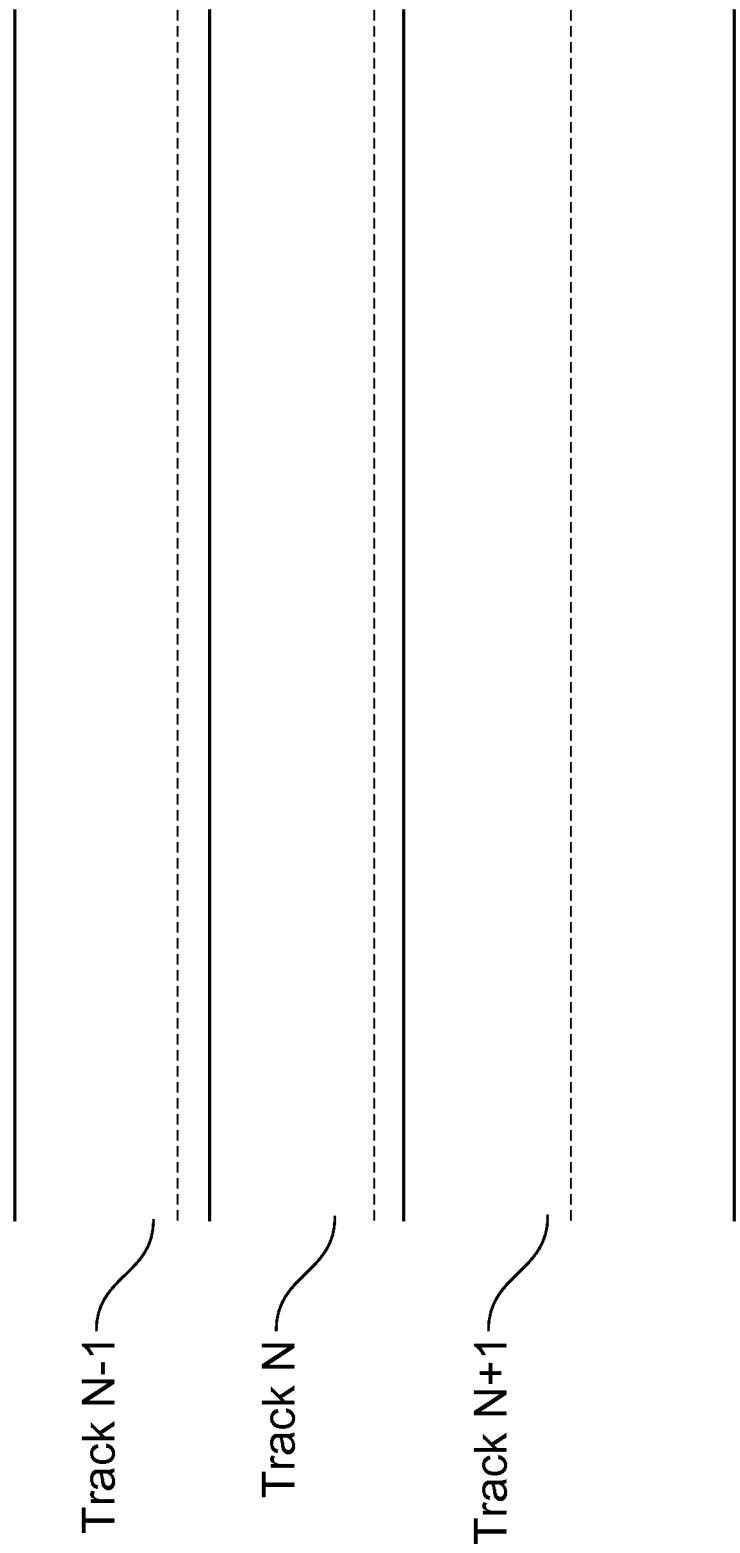
FIG. 1 is an example of a three-track shingled write.

FIG. 1 is an example of a three-track shingled write. In the example, the three tracks are Track N−1, Track N, and Track N+1. In the example, the written track centers are shown as dashed lines and the track edges are shown as sold lines. Tracks N−1, N, and N+1 are written in-order, in an overlapping manner, which acts to increase the number of tracks written per radial inch of a magnetic disk. In the example, the signal read from Track N can be affected by the ITI contributed by adjacent tracks, Track N−1 and Track N+1. As such, to improve the quality of the signal read from Track N, the ITI from one or both of Track N−1 and Track N+1 is canceled from the signal from Track N. Herein, Track N can sometimes be referred to as a "center track." Herein, Track N−1 and Track N+1 can each be referred to as an "adjacent track" or a "side track."

As disclosed herein, ITI from one or both of the side tracks of a center track from which data is desired to be read is canceled from the signal read from the center track. In some embodiments, the ITI from one or both of the side tracks of a center track is canceled during normal operation (e.g., in parallel as data from the center track is read and decoded). In some embodiments, the ITI from one or both of the side tracks of a center track is canceled during recovery (e.g., subsequent to data having been read and attempted to be decoded from the center track and/or after one or more decoding failures have occurred). In some embodiments, a minimum standard of performance must be met such that the following two conditions hold: 1) during normal operation, the act of entering recovery can occur no more frequently than a given specification (typically, no more than 1 sector in 100,000 sectors can enter recovery) such that the performance degradation caused is imperceptible to the user 2) In the event that recovery is entered, nearly all data that enters recovery must be successfully recovered (i.e., it is not acceptable to declare data unrecoverable). In some embodiments, if ITI cancelation is used during normal operation, the signal-to-noise ratio (SNR) improvement afforded by its use will allow the track density to be increased while still maintaining an acceptably low rate of entering recovery, thus translating directly to a disk capacity increase without a noticeable compromise in performance. In some embodiments, if used in recovery, ITI cancelation is a powerful tool to significantly improve the SNR, thus significantly increasing the probability of successfully recovering the data.

In various embodiments, ITI data from one or more side tracks is determined and/or canceled from the signal of a center track without the need for complicated operations (e.g., matrix operations). In some embodiments, ITI data from one track is determined by performing a correlation between the signal read from the center track and the known data of the side track. In some embodiments, ITI data from one or more side tracks is determined and/or canceled from the signal of a center track without requiring side tracks to be phase aligned. In some embodiments, ITI cancelation can be performed with a technique for compensating for frequency differences between the write-clocks of side tracks. In some embodiments, a parallel architecture ITI cancelation is used to take into account frequency offsets and fragmented sectors. In some embodiments, in the event that ITI cancelation fails to provide successful recovery of data from the center track, a technique is used to correct the position of the read-head to successfully recover a sector.

Figure 2:
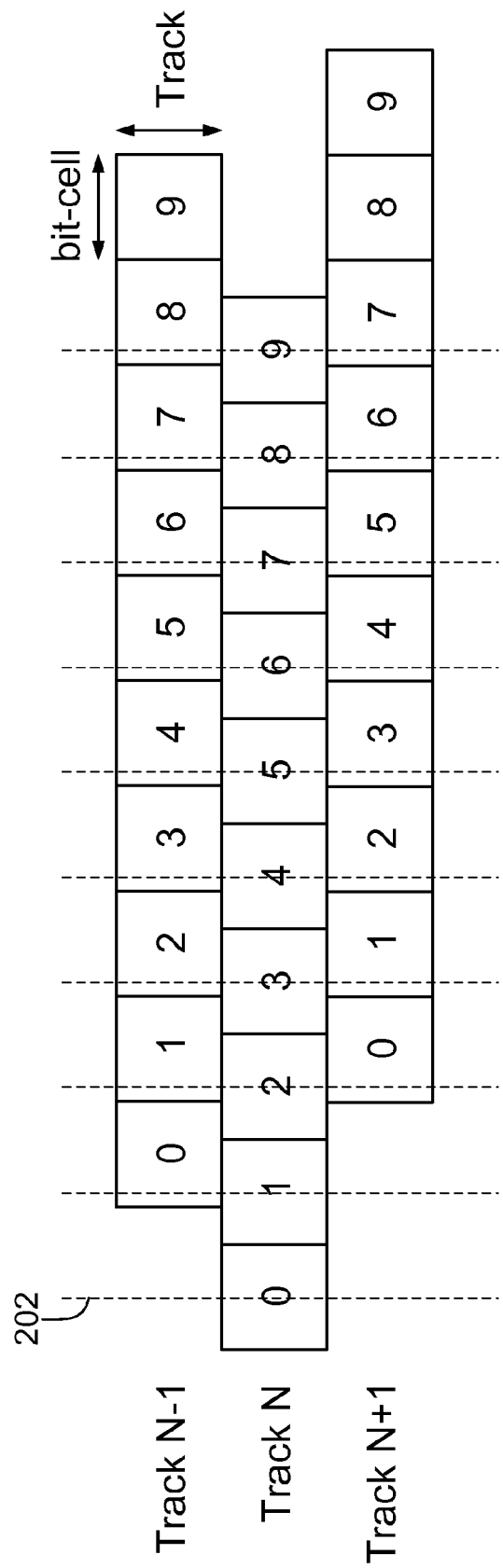
FIG. 2 shows an example of alignment between three adjacent tracks.

FIG. 2 shows an example of alignment between three adjacent tracks. In the example, the three adjacent tracks are Track N−1, Track N, and Track N+1. The vertical dashed lines, such as dashed line 202, represent the (e.g., time looping-based) sampling points of the signal read from center track, Track N. Each box represents a sampled bit and the number within a box represents that bit's position in the sequence of bits sampled from that track. As shown in the example, the sampled bits from Track N−1, Track N, and Track N+1 are not perfectly aligned. The relative offset in alignment between adjacent tracks is sometimes caused by an uncertainty (e.g., due to a write clock) which exists when writing data to a hard-disk drive. In some embodiments, the result of such uncertainty is that the physical location of data written to the drive can only be controlled in a limited fashion and, therefore, the alignment of data in a side track is not known a-priori. Assume that L represents the number of bits prior to or after bit k along Track N (i.e., $b_{k-L}^{(N)}, \ldots, b_k^{(N)}, \ldots, b_{k+L}^{(N)}$). Note that bit k in Track N is aligned with bit (k−1) in Track N−1 (here, we denote the relative alignment between the center-track and the (N−1) track as $L^{(N-1)}=-1$) and bit (k−2) in Track N+1 (similarly, $L^{(N+1)}=-2$). For example, bit 2 of Track N is most significantly affected by bit 1 of Track N−1 and by bit 0 of Track N−1.

The digitized waveform (either equalized or unequalized) read from a center track, Track N at time $k(y_k^{(N)})$ can be expressed in terms of the bits written to Track N ($b_i^{(N)}$), the pulse-shape of Track N ($h_i^{(N)}$), the bits written to Track N−1 ($b_i^{(N-1)}$), the pulse-shape of Track N−1 ($h_i^{(N-1)}$), the bits written to track N+1 ($b_i^{(N+1)}$), the pulse-shape of Track N+1 ($h_i^{(N+1)}$), and the noise sequence ($n_i^{(N)}$) as, $$y_k^{(N)} = \sum_{i=-L}^{L} h_i^{(N)} \cdot b_{k-i}^{(N)} + \sum_{i=-L}^{L} h_i^{(N-1)} \cdot b_{k-i-L^{(N-1)}}^{(N-1)} + \sum_{i=-L}^{L} h_i^{(N+1)} \cdot b_{k-i-L^{(N+1)}}^{(N+1)} + n_k^{(N)}. \quad (1)$$

In equation (1), the first summation (i.e., $\sum_{i=-L}^{L} h_i^{(N)} \cdot b_{k-i}^{(N)}$) corresponds to the desired waveform/data read from the magnetization of media in center track, Track N. The second and third summations (i.e., $\sum_{i=-L}^{L} h_i^{(N-1)} \cdot b_{k-i-L^{(N-1)}}^{(N-1)}$ and $\sum_{i=-L}^{L} h_i^{(N+1)} \cdot b_{k-i-L^{(N+1)}}^{(N+1)}$) represent the ITI terms from side tracks, Tracks N−1 and N+1, respectively. These ITI terms from the side tracks are desired to be canceled from $y_k^{(N)}$ to result in the desired waveform (i.e., the first summation of equation (1)) and noise $n_k^{(N)}$ (which may or may not be removable using noise cancelation techniques). As shown in equation (1), the center track sample at time $k(y_k^{(N)})$ is affected by L bits prior to, and L bits after, bit k along Track N (this is commonly known as Inter-Symbol Interference (ISI)). The effect that the side track data has on the center track read-back signal, however, is offset by integer quantities $L^{(N-1)}$ and $L^{(N+1)}$ for Tracks N−1 and Track N+1, respectively, i.e., bits ($b_{k-i-L^{(N-1)}}^{(N-1)}, \ldots, b_{k-L^{(N-1)}}^{(N-1)}, \ldots, b_{k+L-L^{(N-1)}}^{(N-1)}$) from Track N−1 and bits ($b_{k-i-L^{(N+1)}}^{(N+1)}, \ldots, b_{k-L^{(N+1)}}^{(N+1)}, \ldots, b_{k+L-L^{(N+1)}}^{(N+1)}$) from Track N+1. Referring back to the example of FIG. 2, bit 4 of Track N is most significantly affected by bit 3 of Track N−1 (i.e., $L^{(N-1)}=-1$) and bit 2 of Track N+1 (i.e., $L^{(N+1)}=-2$). While equation (1) assumes that the adjacent tracks are not phase aligned, equation (1) can be easily extended to the aligned (i.e., $L^{(N+1)}=L^{(N-1)}=0$) case.

In equation (1), it is assumed that the relative phase offsets between Tracks N and N−1 (i.e., $L^{(N-1)}$) and Tracks N and N+1 (i.e., $L^{(N+1)}$) have been assumed to be integer values. However, as shown by the example of FIG. 2, relative phase offsets are not necessarily integer values. The relative phase offsets can be assumed to be non-integer values, without a loss of generality. As is the case with any digital communication system, a continuous signal is first sampled and digitized. In doing so, the sampling phase of the interfering signal is also well-controlled (providing the frequency of writing the side-track and center-tracks are substantially similar). For example, as shown in the example of FIG. 2, by sampling the Track N signal in the center of each bit-cell, we are also sampling Track N−1 at a phase which is ≈10% from the right edge of each bit-cell. Thus, this phase difference between the center track, Track N, and the side tracks, Tracks N−1 and N+1, will be taken into the side track pulse-shape estimation.

Figure 3:
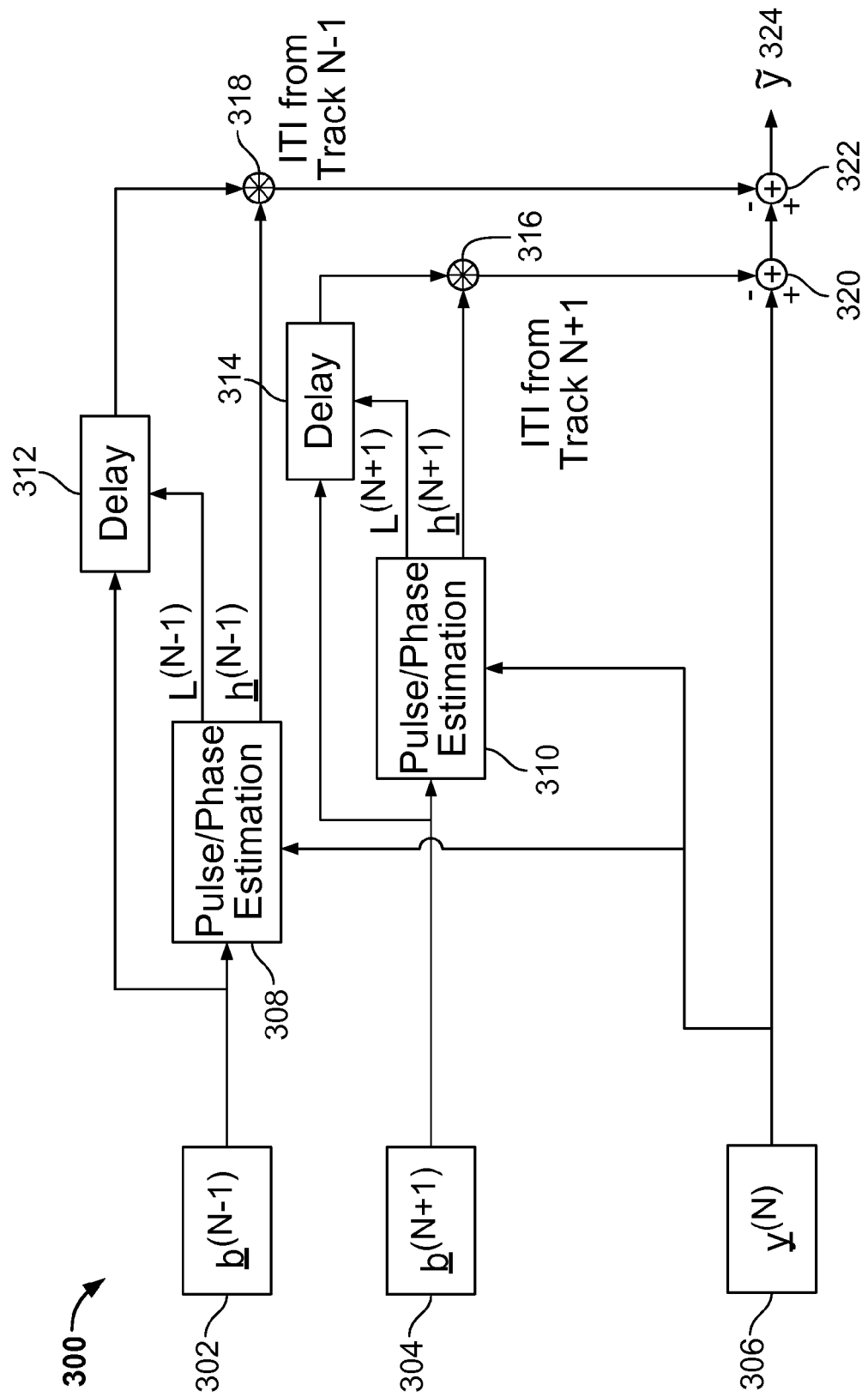
FIG. 3 is a diagram showing an embodiment of a system for ITI cancelation.

FIG. 3 is a diagram showing an embodiment of a system for ITI cancelation. In some embodiments, $\underline{y}^{(N)}$ 306 represents the sequence of samples read from center track, Track N. $\underline{y}^{(N)}$ 306 can be equalized or unequalized. $\underline{y}^{(N)}$ 306 can be represented by equation (1), which shows that $\underline{y}^{(N)}$ 306 includes ITI from both side tracks, Tracks N−1 and N+1. System 300 shows an example of canceling ITI from $\underline{y}^{(N)}$ 306. $\underline{b}^{(N-1)}$ 302 and $\underline{b}^{(N+1)}$ 304 represent sequences of known data from Track N−1 and Track N+1, respectively. While the example of system 300 shows canceling the ITI data contributed from both side tracks, Tracks N−1 and N+1, ITI data from only one side track may be canceled from the data read from center track, Track N, at a time if desired.

Pulse/phase estimation 308 is configured to use $\underline{y}^{(N)}$ 306 and $\underline{b}^{(N-1)}$ 302 to determine phase estimation $L^{(N-1)}$ and pulse shape $\underline{h}^{(N-1)}$ associated with Track N−1 and pulse/phase estimation 310 is configured to use $\underline{y}^{(N)}$ 306 and $\underline{b}^{(N+1)}$ 304 to determine phase estimation $L^{(N+1)}$ and pulse shape $\underline{h}^{(N+1)}$ associated with Track N+1. In some embodiments and as discussed further below, pulse/phase estimation 308 and 310 are configured to determine phase estimation $L^{(N-1)}$ and pulse shape $\underline{h}^{(N-1)}$ and phase estimation $L^{(N+1)}$ and pulse shape $\underline{h}^{(N+1)}$ by performing a correlation of $\underline{y}^{(N)}$ 306 and $\underline{b}^{(N-1)}$ 302 and a correlation of $\underline{y}^{(N)}$ 306 and $\underline{b}^{(N+1)}$ 304, respectively, and then selecting a subset of the produced correlation coefficients.

$\underline{b}^{(N-1)}$ 302 is input into delay 312 so that a delayed version of $\underline{b}^{(N-1)}$ and $L^{(N-1)}$ are correlated at 318 to produce the estimated ITI from Track N−1. $\underline{b}^{(N+1)}$ 304 is input into delay 314 so that a delayed version of $\underline{b}^{(N+1)}$ 304 and $L^{(N+1)}$ are correlated at 316 to produce the estimated ITI from Track N+1. The ITI from Track N−1 can be canceled from $\underline{y}^{(N)}$ 306 at 322 and the ITI from Track N+1 can be canceled from $\underline{y}^{(N)}$ 306 at 320 produce the data read from Track N with ITI from Tracks N−1 and N+1 canceled out: $\tilde{y}^{(N)}$ 324. In some embodiments, pulse/phase estimation 308 and 310 are two instances of the same logic block. In various embodiments, pulse/phase estimation 308 and 310 are implemented using one or both of hardware and software.

Figure 4:
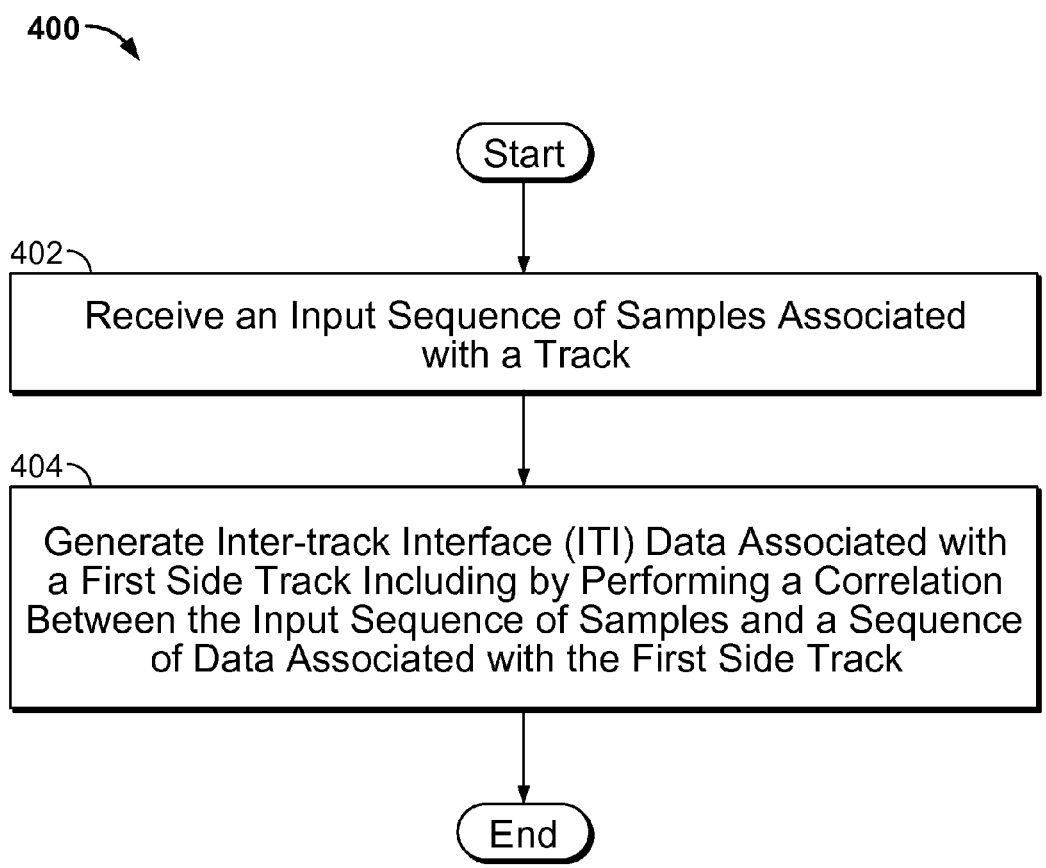
FIG. 4 is a flow diagram showing an embodiment of a process for canceling ITI from a center track.

FIG. 4 is a flow diagram showing an embodiment of a process for canceling ITI from a center track. In some embodiments, process 400 can be implemented at system 300.

In various embodiments, the ITI caused by either/both track(s) adjacent to Track N is determined and, if appropriate, canceled from the signal read from Track N. Process 400 can be used to determine the ITI from one side track (e.g., Track N−1 or Track N+1) but can be repeated for the other side track.

At 402, an input sequence of samples associated with a track is received. In some embodiments, the input sequence of samples is a digitized waveform that is read from a center track (e.g., Track N). The input sequence of samples includes the ITI data from one or both side tracks, as well as noise.

At 404, inter-track interference (ITI) data associated with a first side track is generated, including by performing a correlation between the input sequence of samples and a sequence of data associated with the first side track. In various embodiments, it is assumed that the data from the side track(s), which can be read before canceling ITI, are known or can be estimated with a reasonable degree of accuracy. In some embodiments, the generated ITI data is canceled from the input sequence of samples. In some embodiments and as discussed below, a threshold must be reached prior to canceling the ITI data from the input sequence of samples.

Figure 5:
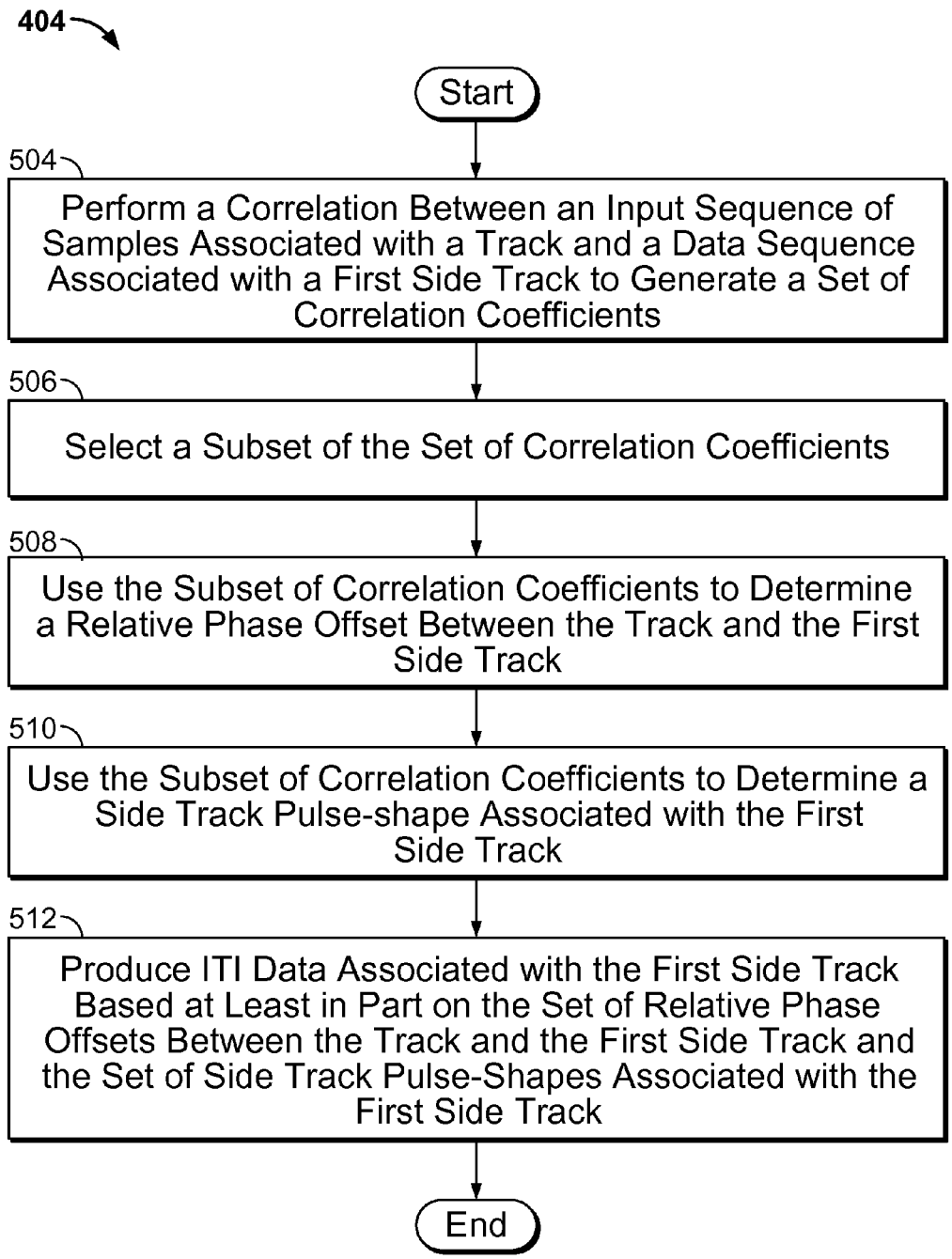
FIG. 5 is a flow diagram showing an embodiment of a process for generating ITI data associated with a side track.

FIG. 5 is a flow diagram showing an embodiment of a process for generating ITI data associated with a side track. In some embodiments, process 500 can be implemented at system 300. In some embodiments, 404 of process 400 can be implemented using process 500. Process 500 can be used to generate the ITI data from one side track (e.g., Track N−1 or Track N+1) but can be repeated for the other side track.

At 504, a correlation is performed between an input sequence of samples associated with a track and a data sequence associated with a first side track to generate a set of correlation coefficients. As mentioned in process 400, the input sequence of samples can be a digitized waveform that is read from a center track (e.g., Track N). Also as mentioned in process 400, the data sequence associated with the side track is assumed to be known or accurately estimated (e.g., using a read processor configured to operate without the ITI cancelation technique described herein).

At 506, a subset of the set of correlation coefficients is selected. In some embodiments, one or more correlation coefficients can be selected. In some embodiments, the subset of correlation coefficients is selected based on detected peak values. In some embodiments, the subset of correlation coefficients is selected based on detected maximum power values. In some embodiments, the subset of correlation coefficients is selected based on detecting the maximum absolute sum values.

At 508, the subset of correlation coefficients is used to determine a relative phase offset between the track and the first side track. For example, in FIG. 3, pulse/phase estimation 308 outputs phase estimation $L^{(N-1)}$ associated with Track N−1.

At 510, the subset of correlation coefficients is used to determine a side track pulse-shape associated with the first side track. For example, in FIG. 3, pulse/phase estimation 308 outputs pulse shape $\underline{h}^{(N-1)}$ (which includes one or more pulse-shape coefficients) associated with Track N−1.

At 512, ITI data associated with the first side track is produced based at least in part on the set of relative phase offsets between the track and the first side track and the set of side track pulse-shapes associated with the first side track. For example, convolution 318 in FIG. 3 outputs an estimate of the ITI from Track N−1. In some embodiments, the ITI data associated with the first side track is computed as a correlation between the set of side track pulse-shapes and the data associated with the side track.

The following is an example of determining ITI data:

Estimating and canceling the ITI from either of side tracks, Track N−1 and N+1, is performed similarly so for the purposes of illustration, only the estimation and cancelation of Track N−1 ITI is discussed below.

To perform cancelation of Track N−1 ITI, the following quantities are first determined:

1. $h_i^{(N-1)}$, i=−L, ..., L
2. $L^{(N-1)}$

Where $h_i^{(N-1)}$ represents the pulse-shape of Track N−1 at relative phase offset i between Tracks N and N−1 and $L^{(N-1)}$ represents the relative phase offset between Tracks N and N−1. As shown in equation (1), the interfering signal read from the adjacent track is fully described in terms of its pulse-shape ($h_i^{(N-1)}$) (which comprises a set of pulse-shape coefficients) and its integer phase misalignment ($L^{(N-1)}$). Thus, using estimates of these values, the side-track interference signal can be reconstructed and subtracted from the center-track signal. Put another way, the estimated set of pulse-shape coefficients ($h_i^{(N-1)}$, i=−L, ..., L) and relative phase offset $L^{(N-1)}$ are used to construct the ITI signal of Track N−1 (i.e., the second summation in equation (1)) and then canceled/subtracted from the center track's (Track N) read-back signal.

To estimate $h_i^{(N-1)}$, i=−L, ..., L and $L^{(N-1)}$, a correlation is performed between the sequence of samples read from Track N and the known data of Track N−1. For example, the correlation can be illustrated as follows:

$$C_m^{(N-1)} = \Sigma_{k=0}^{T-1} y_k^{(N)} \cdot b_{k-m}^{(N-1)} \quad (2)$$

Where $C_m^{(N-1)}$ represents correlation coefficients, $y_k^{(N)}$ represents the digitized waveform (either equalized or unequalized) read from a center track (see equation (1)), $b_{k-m}^{(N-1)}$ represents the known data of Track N−1, T represents the length of the correlation (the number of bits over which correlation is performed) and m represents potential relative phase offsets between Tracks N and N−1. In some embodiments, T can be chosen to the length of a sector. In some embodiments and as further disclosed below, T can be chosen to be the length of a portion of a sector (e.g., a fragment). In some embodiments, the set values for m is chosen to be a conservative or worst case in which the peak of $C_m^{(N-1)}$ would be obtained over the set of m. For example, m can include the set of values that include the $\{-L_{max}, \ldots, L_{max}\}$, where $L_{max}$ is selected to be a value large enough such that the peak of $C_m^{(N-1)}$ can be determined between $-L_{max}$ and $L_{max}$. In some embodiments, $L_{max}$ is largely dictated by accuracy and precision with which a sector may be written to the disk.

Substituting equation (1) into equation (2) gives, $$C_m^{(N-1)} = \sum_{i=-L}^{L} h_i^{(N)} \sum_{k=1}^{T} b_{k-m}^{(N-1)} b_{k-i}^{(N)} + \sum_{i=-L}^{L} h_i^{(N-1)} \sum_{k=1}^{T} b_{k-m}^{(N-1)} b_{k-i-L}^{(N-1)(N-1)} + \sum_{i=-L}^{L} h_i^{(N+1)} \sum_{k=1}^{T} b_{k-m}^{(N-1)} b_{k-i-L}^{(N+1)(N+1)} + \sum_{k=1}^{T} b_{k-m}^{(N-1)} n_k^{(N)}. \quad (3)$$

Equation (2) can be simplified using the following assumptions:

1. There is negligible correlation between the data-sequences written to Tracks N−1, N, N+1.
2. There is negligible correlation between each side track data sequence and the noise sequence of Track N.
3. There is negligible correlation between each side track data sequence and shifts of itself.

Due to assumption 1, the following simplifications can be made:

$$\sum_{k=1}^{T} b_{k-m}^{(N-1)} b_{k-i}^{(N)} = 0 \quad (4)$$

$$\sum_{k=1}^{T} b_{k-m}^{(N-1)} b_{k-i-L}^{(N+1)(N+1)} = 0. \quad (5)$$

Due to assumption 2, the following simplification can be made:

$$\sum_{k=1}^{T} b_{k-m}^{(N-1)} n_k^{(N)} = 0. \quad (6)$$

Due to assumption 3, for a given value of i, $i \neq m - L^{(N-1)}$, $$\sum_{k=1}^{T} b_{k-m}^{(N-1)} b_{k-i-L}^{(N-1)(N-1)} = 0. \quad (7)$$

Whereas, for $i = m - L^{(N-1)}$, $$\sum_{k=1}^{T} b_{k-m}^{(N-1)} b_{k-i-L}^{(N-1)(N-1)} = \sum_{k=1}^{T} b_{k-m}^{(N-1)} b_{k-m}^{(N-1)} = T. \quad (8)$$

From all of these simplifications, equation (3) can be re-expressed as:

$$C_m^{(N-1)} = T \cdot h_{m-L^{(N-1)}}^{(N-1)}. \quad (9)$$

Figure 6:
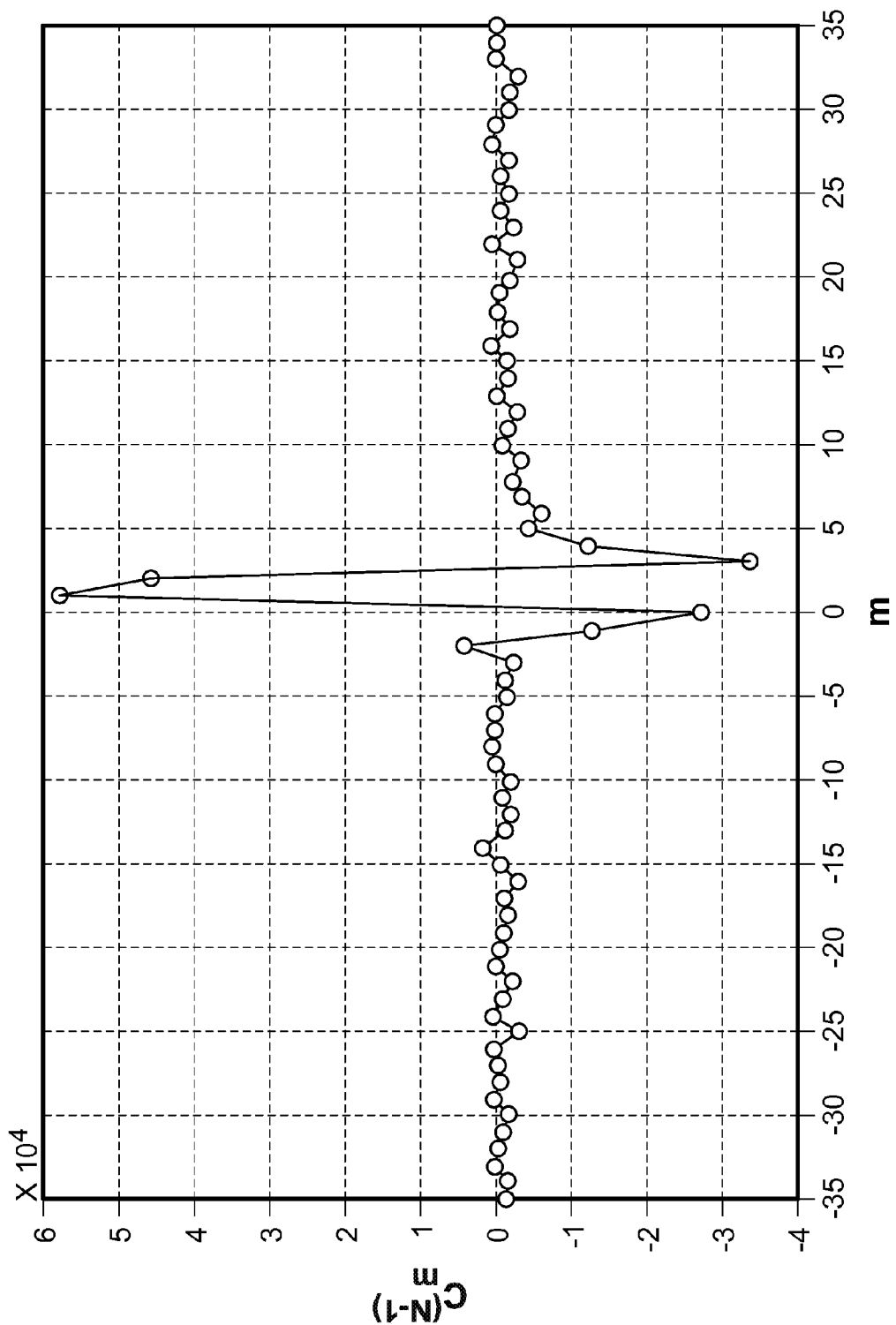
FIG. 6 shows an example of a plot of $C_m^{(N-1)}$ over $m \in \{-35, \ldots, 35\}$ where $L_{max}=35$.

FIG. 6 shows an example of a plot of $C_m^{(N-1)}$ over $m \in \{-35, \ldots, 35\}$ where $L_{max} = 35$. In the example, 35 was chosen to be the worst case scenario/presumed greatest possible shift/lag between Tracks N and N−1. The plot of FIG. 6 was obtained using a production hard-disk drive.

If $C_m^{(N-1)}$ is computed for $m \in \{-35, \ldots, 35\}$, from equation (9), it can be seen that in computing correlation $C_m^{(N-1)}$, pulse-shapes $h_i^{(N-1)}$ (within a scale factor of T) were also computed (i.e., $h_i^{(N-1)} = C_m^{(N-1)}/T$), $$[h_{-L_{max}-L^{(N-1)}}^{(N-1)}, \ldots, h_{L_{max}-L^{(N-1)}}^{(N-1)}]. \quad (10)$$

To ensure that the entire side-track pulse shape $[h_{-L}, \ldots, h_L]$ (where each $h_i$ is a pulse-shape coefficient) is produced by this computation, the following must hold, $$[-L_{max} - L^{(N-1)}] \leq -L \text{ and } [L_{max} - L^{(N-1)}] \geq L \quad (11)$$

Or $$L_{max} \geq [L - L^{(N-1)}] \text{ and } L_{max} \geq [L + L^{(N-1)}]. \quad (12)$$

Where L is the length of the pulse-shape. The length of L depends on a number of factors such as the density of the bits written to the disk. For example, if data were written at twice the bit density, then the pulse-shape will be twice as long (i.e., L is twice as long). In various embodiments, L is chosen to be long enough to capture the entire pulse-shape length. Referring back to FIG. 6, there are about 6-7 correlation coefficients ($C_m^{(N-1)}$) of significant magnitude (i.e., $C_m^{(N-1)} > 0$). All the remaining correlation coefficients are about zero. Thus, in this example, L would need to be set to about 3 (i.e., a pulse-shape would include 7 correlation coefficients) to encapsulate the whole pulse response.

In some embodiments, the values of $L^{(N-1)}$ that are observed in practice depend on how accurately the write process can be controlled and, therefore, $L_{max}$ is chosen to accommodate the worst-case scenario for the system being considered. Put another way, a write process with relatively good control over its write process (i.e., it can guarantee that the start of an adjacent track and the start of a center track are relatively close together) can use a smaller $L_{max}$ than another write process which does not have as much control over its write process.

With the computation of $C_m^{(N-1)}$ given as equation (2) carried out for $m \in \{-L_{max}, \ldots L_{max}\}$, where $L_{max}$ is chosen to satisfy equation (12), it is ensured that the entire side track pulse-shape $\underline{h}^{(N-1)} = [h_{-L}^{(N-1)} \ldots h_L^{(N-1)}]$ is computed. In some embodiments, the computation of $C_m^{(N-1)}$ can be conducted in parallel for each value of m.

The determined set of correlation coefficients $C_m^{(N-1)}$ can be used to determine $h_i^{(N-1)}$ and $L^{(N-1)}$. In various embodiments, a subset of the set of computed correlation coefficients $C_m^{(N-1)}$ can be used to determine $h_i^{(N-1)}$ and $L^{(N-1)}$. For example, one of the following techniques can be used to select the index (m*) of the coefficient to use:

1. Peak detect: Defining the maximum absolute correlation index as:

$$m^* = \arg\max_{m \in \{-L_{max}+L, \ldots, L_{max}-L\}} |C_m^{(N-1)}| \quad (13)$$

2. Maximum power: Defining the maximum power index as, $$m^* = \arg\max_{m \in \{-L_{max}+L, \ldots, L_{max}-L\}} \sum_{i=-L}^{L} [C_{m+i}^{(N-1)}]^2 \quad (14)$$

3. Maximum absolute sum: Defining the maximum power index as, $$m^* = \arg\max_{m \in \{-L_{max}+L, \ldots, L_{max}-L\}} \sum_{i=-L}^{L} |C_{m+i}^{(N-1)}| \quad (15)$$

As each of the three arg max functions of equations (13), (14), and (15) indicate a set of (one or more) values of m* for which the function that is the argument of the arg max function (e.g., $|C_m^{(N-1)}|$, $\sum_{i=-L}^{L}[C_{m+i}^{(N-1)}]^2$, and $\sum_{i=-L}^{L}|C_{m+i}^{(N-1)}|$) attains its largest value, the subset of selected correlation coefficients can be represented as the set of $C_{m^*+i}^{(N-1)}$.

The side track pulse-shape and the relative offset values are given as, $$h_i^{(N-1)} = \frac{C_{m^*+i}^{(N-1)}}{T}, i \in \{-L, \ldots, L\} \quad (16)$$

$$L^{(N-1)} = m^*. \quad (17)$$

For the example shown in FIG. 6, for L=3, all three techniques give the result m*=1 and $\underline{h}^{(N-1)} = [C_{-2}^{(N-1)}, \ldots, C_4^{(N-1)}]/T$. The following is an example of canceling ITI data from the signal read from the center track:

Continuing the example of performing ITI cancelation with the ITI contributed from the side track, Track N−1, with the values of $\underline{h}^{(N-1)}$ and $L^{(N-1)}$ determined above, ITI is canceled by reconstructing the interfering signal and subtracting it from each sample of the center track read-back signal as:

$$\tilde{y}_k = y_k - \Sigma_{i=-L}^{L} h_i^{(N-1)} \cdot b_{k-i-L^{(N-1)}}^{(N-1)} \quad (18)$$

Where $\tilde{y}_k$ represents the signal of the center track with ITI from Track N−1 canceled out, $y_k$ represents the read-back signal of the center track, and $\Sigma_{i=-L}^{L} h_i^{(N-1)} \cdot b_{k-i-L^{(N-1)}}^{(N-1)}$ represents the reconstructed (i.e., determined) ITI signal from Track N−1. Note that $y_k$ can be represented by equation (1).

As mentioned above, the techniques of determining ITI and canceling ITI shown for side track, Track N−1, can also be applied to the other side track, Track N+1.

Figure 7:
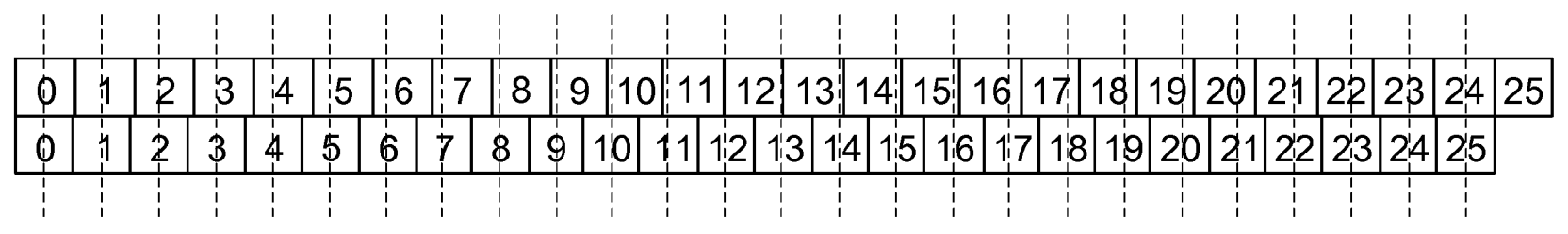

FIG. 7 shows an example of adjacent tracks with frequency offsets. Frequency offsets are caused at least in part by adjacent tracks being written at different clock frequencies. In the example, the write-clock for the top track is slower than the write-clock for the bottom track. To more clearly illustrate the frequency offset, bit 0 of both tracks begin completely aligned (i.e., zero phase offset), and by the time bit 24 of the top track occurs it is completely aligned with bit 25 of the bottom track (i.e., offset of 1 bit). Such frequency offsets can negatively affect the determination and cancelation of ITI from side tracks. The example given above for the determination and cancelation of ITI from side tracks assumes unchanging phase alignment (i.e., zero frequency offsets) between adjacent tracks. However, as further discussed below, frequency offsets can exist between adjacent tracks and affect the determination and cancelation of ITI from side tracks.

Figure 8:
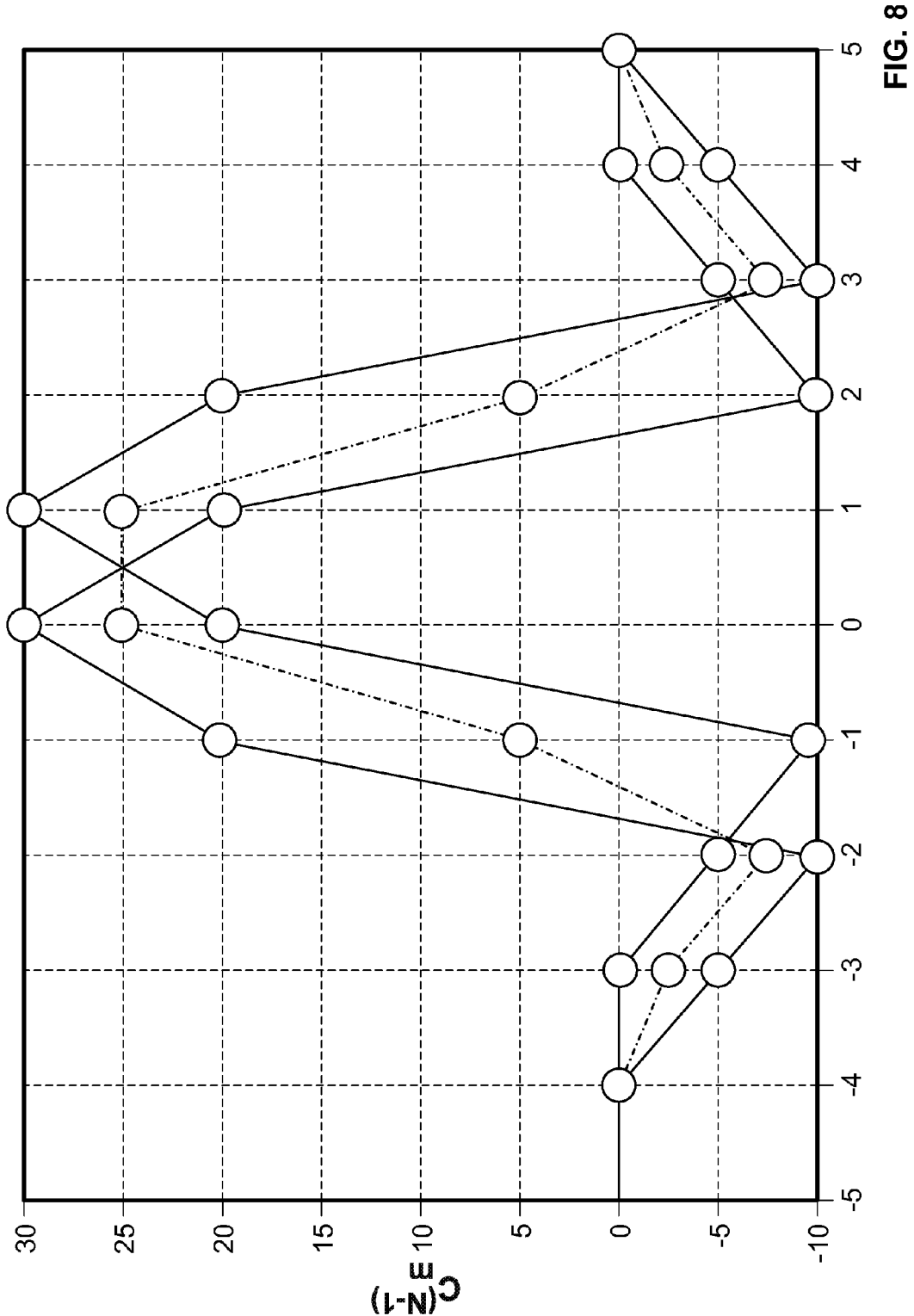
FIG. 8 shows an example of a plot of correlation coefficients with different relative phase offsets.

FIG. 8 shows an example of a plot of correlation coefficients with different relative phase offsets. In the example, the left solid curve shows the $C_m^{(N-1)}$ for a sector with $L^{(N-1)}=0$, the right solid curve shows the $C_m^{(N-1)}$ for a sector with $L^{(N-1)}=1$, the dashed line shows a sector with the first half of adjacent tracks with $L^{(N-1)}=0$ and the second half with $L^{(N-1)}=1$. Note that the dashed line is the average of the two solid lines. The example shows that frequency offsets act to average (smear) the pulse-shape estimates. As the frequency difference becomes more severe, its detrimental impact on the pulse-shape estimation increases. If the frequency difference is too large, $C_m^{(N-1)}$ goes to zero (i.e., it will not be possible to estimate the side-track pulse-shape).

In some embodiments, to mitigate the negative effects of frequency offsets on the ITI cancelation technique described herein, a sector is broken into multiple segments (fragments) where the phase alignment is assumed to be constant over the segment and ITI is computed and canceled for each fragment. For example, if there exists a 0.01% frequency difference between adjacent sectors, then the alignment between the sectors will slip 1 bit-period every 10,000 bit-periods. Since current sector lengths can be in excess of 30,000 bit-periods, choosing T (see equation (2)) to be equivalent to the sector length would incur a drastic performance loss. So, in some embodiments, a sector is split into fragments of smaller length (for example, 2500 bit-periods, in which the phase alignment between adjacent sectors only drifts by 25% of a bit-period). Put in other words, there is more frequency offset per sector than there is per fragment because a sector includes more bits than a fragment. As such, $\underline{h}^{(N-1)}$ and $L^{(N-1)}$ may be estimated for each fragment individually such that ITI may be canceled over these, relatively frequency-coherent, segments.

In practice, the amount of frequency offset which is present in a hard-disk drive is dependent on many factors (such as use of control loops to strictly set the frequency of the write clock and mechanical variations in the hard-disk assembly (HDA)). Because the frequency offsets are dependent upon many factors (e.g., related to the drive), in some embodiments, the manner in which sectors are fragmented to combat the offsets can be chosen based on the current system's performance (e.g., in some embodiments a fragment length is configurable or otherwise adjustable).

Figure 9:
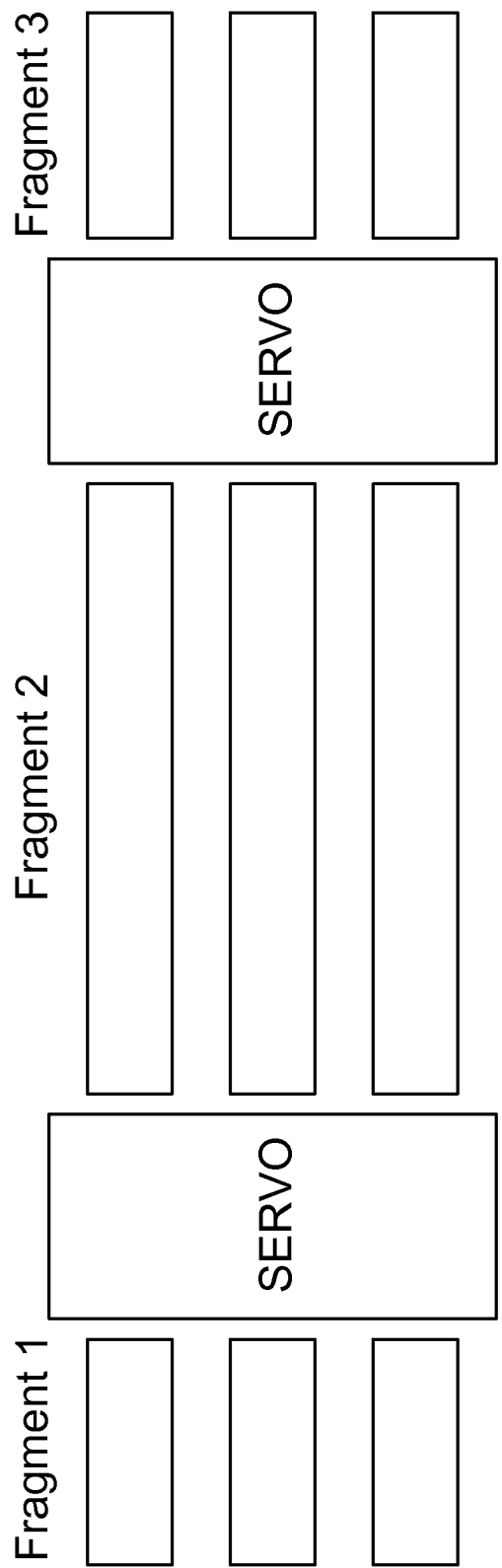
FIG. 9 shows an example in which a sector is fragmented based on the position of Servo wedges.

FIG. 9 shows an example in which a sector is fragmented based on the position of Servo wedges. In some embodiments a sector may be fragmented for ITI cancelation purposes to align with the position of Servo wedges. The surface of a magnetic disk is segmented into regions in which data is stored and regions in which information (known as Servo) is stored which is used to drive many control subsystems to ensure reliable operation of the drive. Since these Servo wedges occur at regular intervals, it is often the case that, given a sector start location, an entire sector cannot fit before the next Servo wedge. In the interest of maximizing the disk capacity, a portion of the sector is written preceding the Servo wedge, and the remainder is written after the Servo wedge. Sometimes, a single sector may be split across multiple Servo wedges. As shown in the example of FIG. 9, sectors from three adjacent tracks are each split into three fragments.

When ITI is computed and canceled per each fragment, it cannot be assumed that the interference signal pulse-shapes or phase-offsets are equivalent between different fragments of the same sector. Thus, in some embodiments, the interference signal pulse-shapes or phase-offsets are independently determined for each fragment of a sector.

Figure 10:
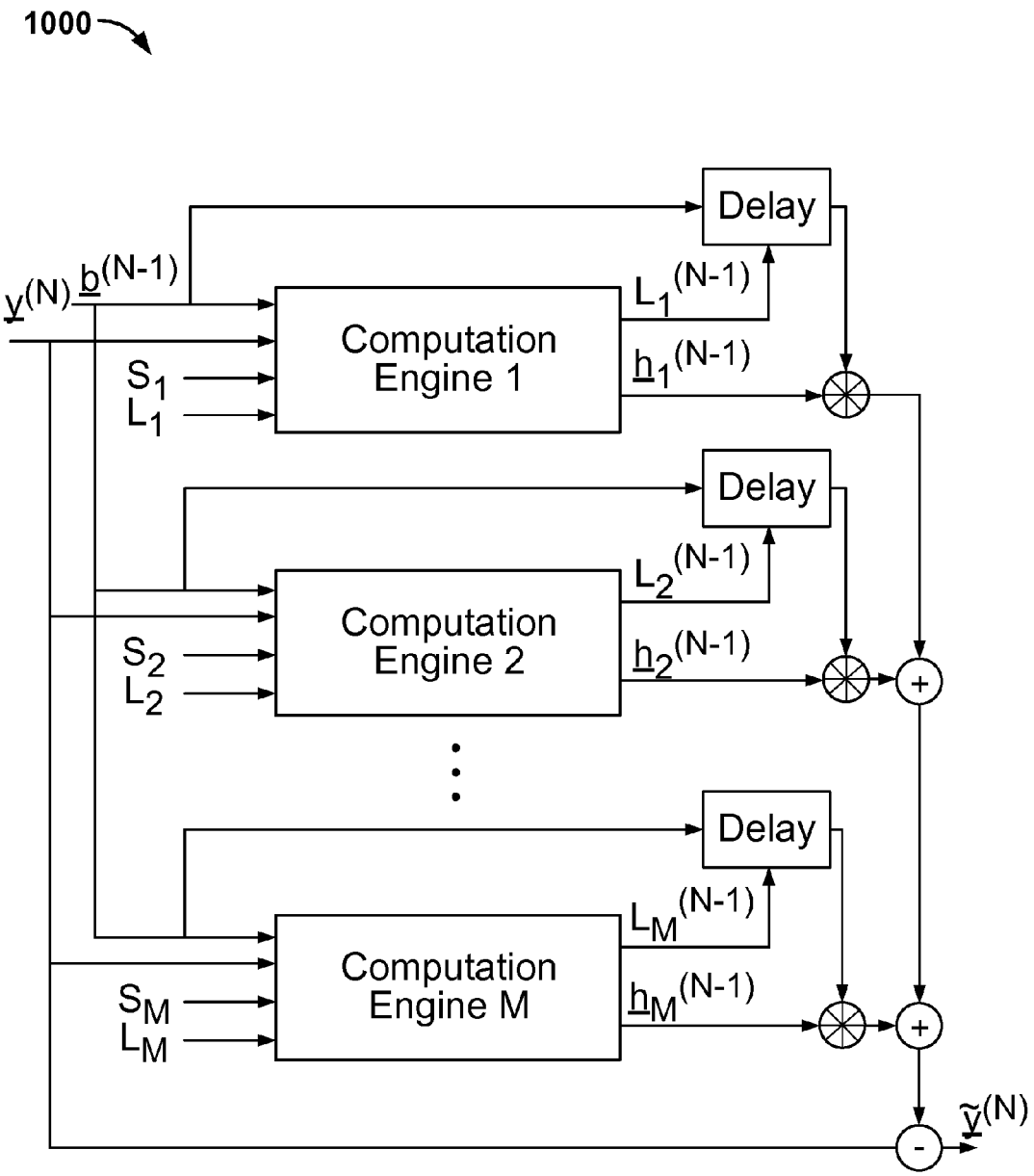
FIG. 10 is a diagram showing an embodiment of a system for ITI cancelation, where ITI cancelation is independently performed for each fragment.

FIG. 10 is a diagram showing an embodiment of a system for ITI cancelation, where ITI cancelation is independently performed for each fragment. In the example, each computation engine (Computation Engine 1, Computation Engine 2, . . . , Computation Engine M) is configured to determine the ITI for a corresponding fragment (e.g., of a sector). For example, Computation Engine 1 inputs (for a first fragment) the relevant data for the center track and adjacent track to generate the ITI information for that fragment. Unnecessary information not needed for ITI processing for that fragment may be input and ignored or not input at all. As shown in the example, ITI can be determined and canceled for each fragment of a sector in parallel and the ITI-canceled signals from each fragment can be combined back together to produce $\tilde{y}^{(N)}$. For exemplary purposes, system 1000 shows only canceling ITI for one side track, Track N−1, but ITI for the other side track, Track N+1, can be canceled in a similar manner. The two main inputs for each computation engine are data-bits from the adjacent track $\underline{b}^{(N-1)}$ and the digitized samples (equalized or unequalized) from the center-track ($\underline{y}^{(N)}$). In some embodiments, both the data-bits from the adjacent track $\underline{b}^{(N-1)}$ and the digitized samples (equalized or unequalized) from the center-track ($\underline{y}^{(N)}$) can be saved in memory (e.g., by the hardware) after each, respective, track is read. For example, in some embodiments the ITI cancelation process described herein is only used if an initial read processing attempt (e.g., which did not include this ITI cancelation technique) fails. In some embodiments, $\underline{b}^{(N-1)}$ is passed to system 1000 by the hard disk controller. The other system inputs of $(S_1, S_2, \ldots, S_M)$ and $(L_1, L_2, \ldots, L_M)$ are the fragment start locations and fragment lengths, respectively. In some embodiments, the values of $(S_1, S_2, \ldots, S_M)$ and $(L_1, L_2, \ldots, L_M)$ are set by firmware since hardware may be unaware of the format of sectors written to the disk. The fragmentation of sectors can be set in a variety of ways. In some embodiments, the sector fragmentation is set by hardware; the values are set can be determined by an estimate of the frequency offset that is preset. In some embodiments, the sector fragmentation is set by firmware. In some embodiments, hardware can notify the firmware when ITI cancelation is completed (i.e., the computation of $\hat{y}^{(N)}$ is completed). As such, the values of $(S_1, S_2, \ldots, S_M)$ and $(L_1, L_2, \ldots, L_M)$ may be reset in order to begin ITI cancelation on another set of M fragments. In this way, the number of computation engines utilized to compute $\hat{y}^{(N)}$ need not be a limiting factor for the number of fragments that a sector may be split into.

Although in the above examples, the digitized read-back signal (or equalized digital signal) was directly used to estimate the side track pulse-shape using the correlation function given by equation (2), in some embodiments, the error signal may, instead, be used to estimate side track pulse-shape. In some embodiments, the simplifications of equations (4), (5), (6), and (7) are better suited for infinitely-long random sequences and not as well for finite length sequences. Of the four simplifications, equation (4) is the most exposed since it is multiplied by $\underline{h}^{(N)}$. Since the center track is being read, $\underline{h}^{(N)}$ contains significantly more power than $\underline{h}^{(N-1)}$ or $\underline{h}^{(N+1)}$ and, therefore, even if the correlation between the data written to Tracks N and N−1 is small, the contribution of this term may not be. As such, in some embodiments, $\underline{h}^{(N)}$ can be removed before computing the correlation function. In many read-channel architectures, the center track pulse-shape $\underline{h}^{(N)}$ is known or can be easily estimated. Furthermore, the data from Track N $\underline{b}^{(N)}$ may be estimated with a reasonable degree of accuracy using the sequence $\underline{y}^{(N)}$ and, therefore, this term can be reasonable estimated as, $$\hat{y}_k^{(N)} = \Sigma_{i=-L}^{L} h_i^{(N)} \cdot \hat{b}_{k-i}^{(N)} \tag{19}$$

Where $\hat{b}^{(N)}$ is the estimated data from Track N. Using $\hat{y}_k^{(N)}$, an error term is computed as, $$e_k^{(N)} = y_k^{(N)} - \hat{y}_k^{(N)}, \tag{20}$$

Which is used to compute the correlation function $$\tilde{C}_m^{(N-1)} = \Sigma_{k=0}^{T-1} e_k^{(N)} \cdot b_{k-m}^{(N-1)}. \tag{21}$$

Note that equation (21) is equation (2) where $e_k^{(N)}$ is substituted for $y_k^{(N)}$. Here, $\tilde{C}_m^{(N-1)}$ is used to compute the side track pulse-shape. The techniques for extracting side track pulse-shapes as discussed above can also apply for using the error signal $e_k^{(N)}$ to perform ITI cancelation.

In some embodiments, whether ITI cancelation from one or both side tracks is performed depends on whether a side track threshold is met or exceeded. One reason for ignoring the ITI from either or both of the side tracks is that sometimes the noise introduced into the system by canceling ITI may exceed the added value of performing ITI cancelation. For example, if the read-head were positioned very close to Track N−1 (far away from Track N+1), then creating and canceling an interference signal for Track N+1 may add more noise to the system than it removes (since it cannot be estimated with a high degree of accuracy). As such, in some embodiments, a subset of correlation coefficients can be determined (e.g., using one of methods as described by equations (13), (14), and (15)) but if the function (e.g., $\Sigma_{i=-L}^{L}[C_{m+i}^{(N-1)}]^2$ and $\Sigma_{i=-L}^{L}|C_{m+i}^{(N-1)}|$) being maximized or a maximum absolute value that is being detected (e.g., $|C_m^{(N-1)}|$) does not exceed a set threshold, then no ITI cancelation is performed for that side track.

Figure 11:
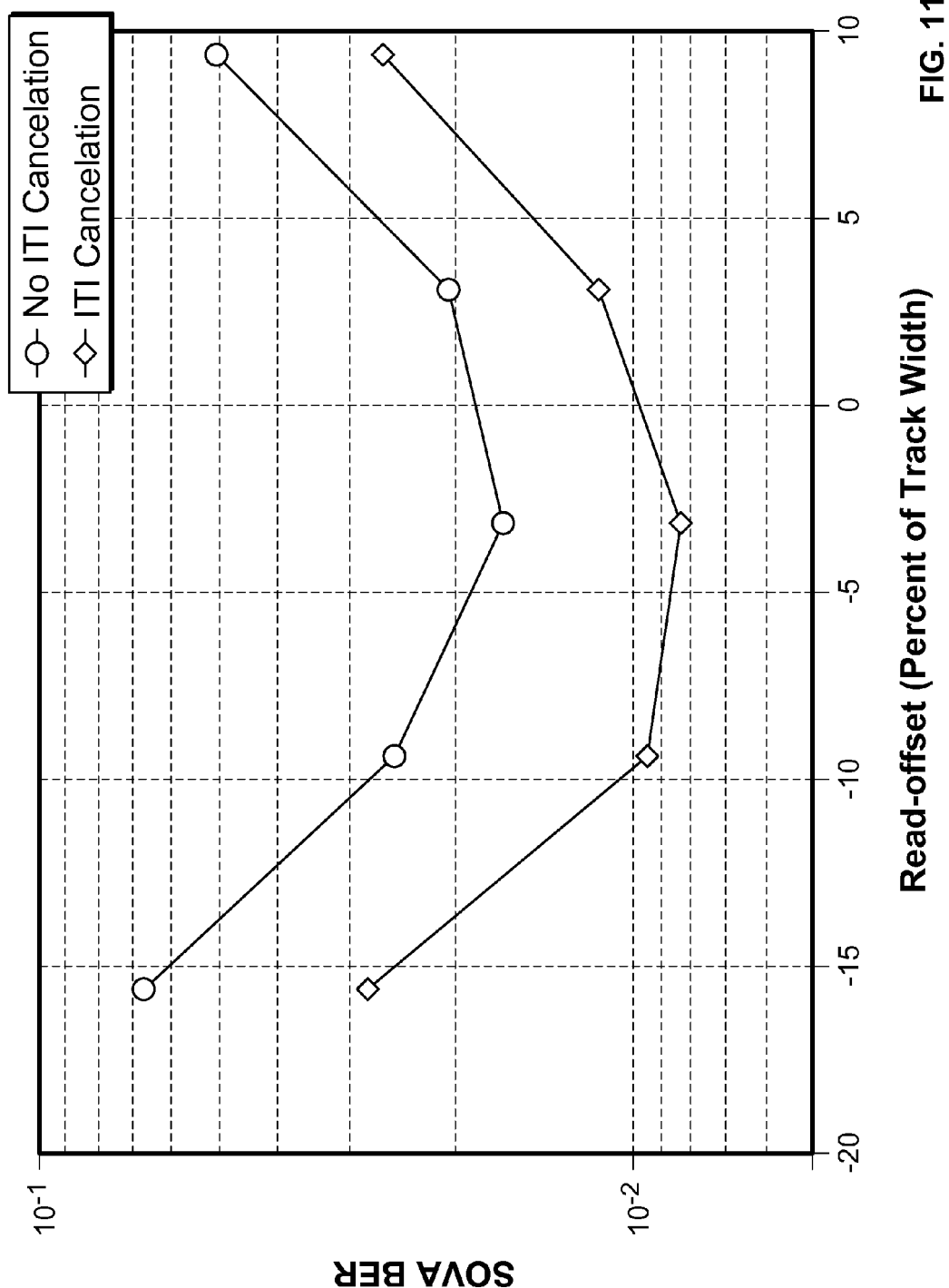
FIG. 11 is an example of a plot of Soft-Output Vertibi Algorithm (SOVA) bit rate error (BER) as a function of the read-offset with and without the use of ITI cancelation.

FIG. 11 is an example of a plot of Soft-Output Vertibi Algorithm (SOVA) bit rate error (BER) as a function of the read-offset with and without the use of ITI cancelation. As shown in the example, with the use of ITI cancelation, the track width is significantly increased, and the BER is significantly decreased. To produce the plot of the example, a production hard-disk drive was used to perform a shingled-write. The center track, Track N, was read a number of times at different read-offset values (i.e., deviations from the center of the track) and the digitized samples were collected for each read. These samples were then applied to bit-true models of the designed methodologies to establish the performance with and without the use of ITI cancelation. As shown in the example, for a give SOVA BER, the effective track width (i.e., the width of the track such that the SOVA BER is achievable) is significantly increased. For example, a target SOVA BER of 2e-2 is achievable for read-offset positions of [−6%, 3%] (9% of the track) without ITI cancelation, whereas it is achievable for read-offset positions of [−13%, 7%] (20% of the track) using ITI cancelation. Furthermore, for a given read-offset value, the achievable SOVA BER can be significantly reduced using ITI cancelation.

Figure 12:
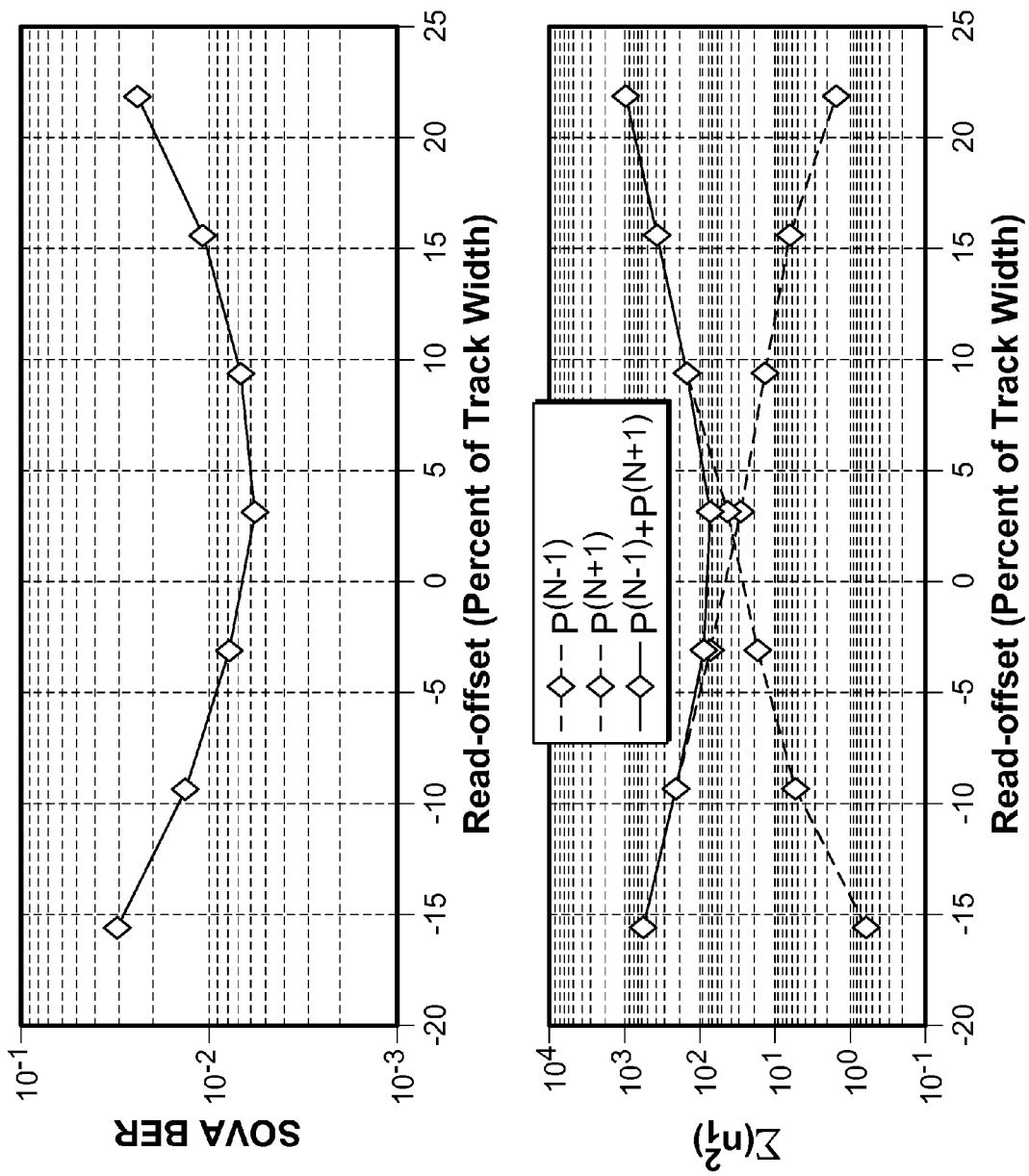
FIG. 12 is an example of SOVA BER using ITI cancelation and the individual interference noise powers and the total interference power.

FIG. 12 is an example of SOVA BER using ITI cancelation and the individual interference noise powers and the total interference power. In the example, the top plot depicts the SOVA BER using ITI cancelation and the bottom plot shows the plotted curves associated with individual interference noise powers $P^{(N-1)}$ and $P^{(N+1)}$ (dashed lines) and the total interference power (solid line). As shown in the example, there is a strong correlation between the read-offset position which balances $P^{(N-1)}$ and $P^{(N+1)}$ and the BER optimal read-offset position (which is at approximately read-offset of 3.5 percent of track width). Based on this observed correlation, in some embodiments, if after performing ITI cancelation of one or both side tracks from the read-back signal of a center track, and the data of the center track cannot be successfully recovered, the position of the read head can be adjusted to improve the likelihood that the read-back signal from the center track will be successfully recovered on a subsequent read. In some embodiments, the position of the read head can be adjusted based on ITI noise powers of the side tracks.

Figure 13:
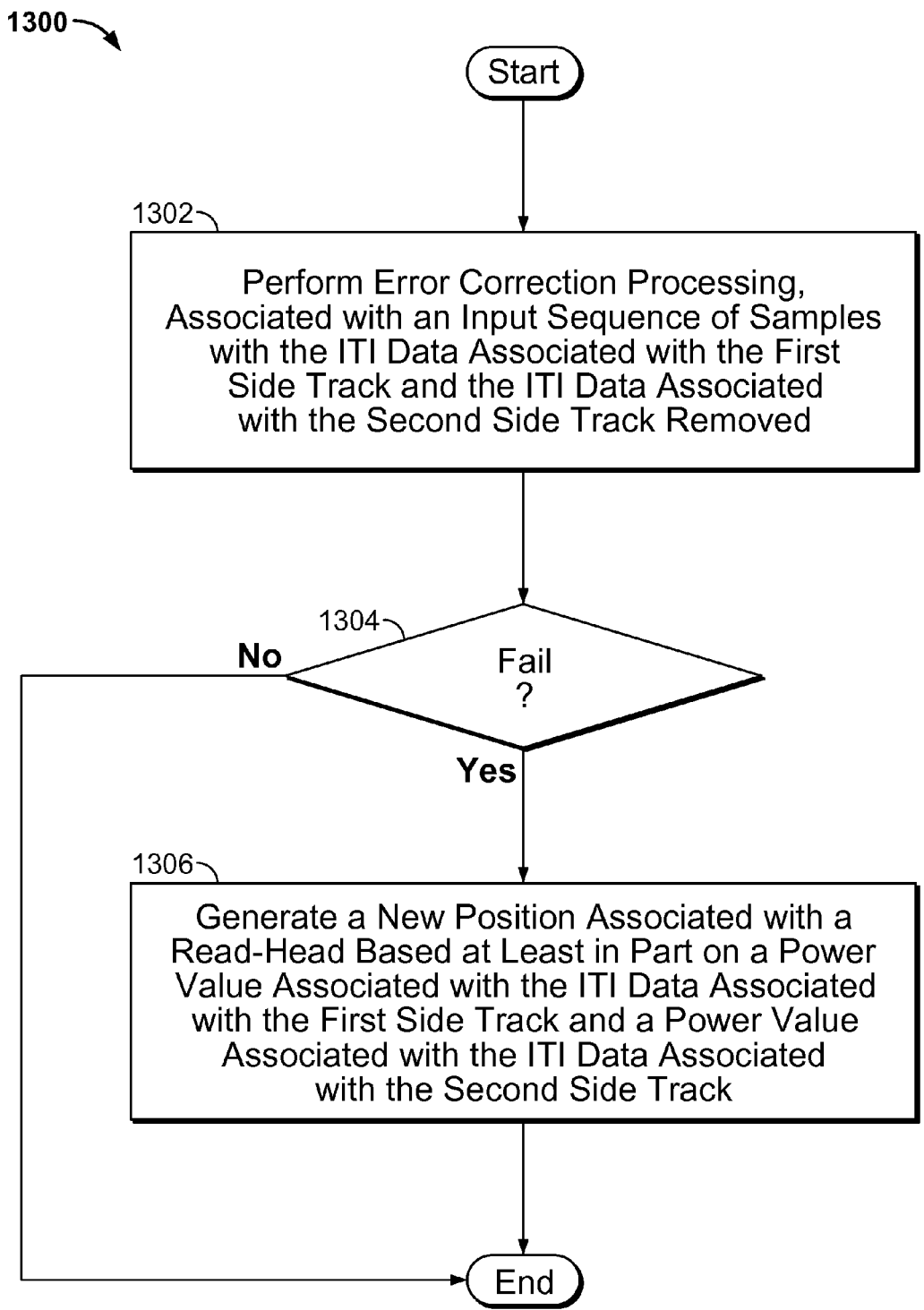
FIG. 13 is a flow diagram showing an embodiment of a process for determining a new position for a read-head.

FIG. 13 is a flow diagram showing an embodiment of a process for determining a new position for a read-head. In some embodiments, process 1300 can be implemented at system 100.

At 1302, error correction processing, associated with an input sequence of samples with the ITI data associated with the first side track and the ITI data associated with the second side track removed, is performed.

At 1304, it is determined whether the error correction processing has failed. In the event the error correction processing has failed, control passes to 1306. In the event that the error correction processing succeeds, process 1300 ends.

At 1306, a new position associated with a read-head is generated based at least in part on a power value associated with the ITI data associated with the first side track and a power value associated with the ITI data associated with the second side track.

For example, if read processing fails using the ITI cancelation technique described herein, it can be determined which contribution from the side tracks is stronger. If the contribution from Track N−1 is stronger (for example), then it may be concluded that the read head is closer to that track and the read-head is moved away from Track N−1 and towards Track N+1 (ideally so that it is between the two adjacent tracks and directly over Track N). Using the new read-head position, data from the center track is read back and read processing is performed (e.g., with or without the ITI cancelation technique described herein).

Referring back to the example of FIG. 12, a common reason for which data even after ITI cancelation cannot be successfully recovered is that the read-head was not positioned over the center track in a BER optimal location. Thus, knowledge of an incorrect read-position can be utilized to compensate on subsequent reads.

For example, as shown above, in determining the ITI of a side track, the pulse shape (e.g., $h_i^{(N-1)}$ or $h_i^{(N+1)}$) of that side track is estimated. Using such pulse-shape estimates, the read-back power from the side tracks are computed as:

$$P^{(N-1)} = \sum_{i=-L}^{L} [h_i^{(N-1)}]^2 \quad (22)$$

$$P^{(N+1)} = \sum_{i=-L}^{L} [h_i^{(N+1)}]^2. \quad (23)$$

$P^{(N-1)}$ and $P^{(N+1)}$ can therefore be easily computed and made available to the hard-disk controller. By plotting the $P^{(N-1)}$, $P^{(N+1)}$, and their sum $(P^{(N-1)}+P^{(N+1)})$ along a plot such as the bottom plot of FIG. 12, the read-head position can be adjusted to be at a new position associated with the read-offset location of the lowest point of the $P^{(N-1)}+P^{(N+1)}$ curve for a subsequent read to improve the probability that the sector can be recovered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an input sequence of samples associated with a track on magnetic storage;
using a processor to generate inter-track interference (ITI) data associated with a first side track, including by performing a correlation between the input sequence of samples and a sequence of data associated with the first side track in order to produce a set of correlation coefficients;
using at least some correlation coefficients from the set to determine whether to remove the ITI data associated with the first side track from the input sequence of samples; and
in the event it is determined to not remove the ITI data associated with the first side track, not removing the ITI data associated with the first side track from the input sequence of samples.

2. The method of claim 1, wherein generating ITI data further includes selecting a subset of the set of correlation coefficients.

3. The method of claim 2, wherein the selected subset of correlation coefficients is used to determine one or more of the following: (1) a relative phase offset between the track and the first side track or (2) a side track pulse-shape associated with the first side track.

4. The method of claim 2, wherein selecting a subset of the set of correlation coefficients is based at least in part on one or more of the following: a peak value associated with the set of correlation coefficients, a maximum power value associated with the set of correlation coefficients, or a maximum absolute sum value associated with the set of correlation coefficients.

5. The method of claim 1, wherein generating ITI data associated with the first side track includes independently generating ITI data for each of two or more fragments associated with the first side track.

6. The method of claim 5, wherein each of the two or more fragments associated with the first side track are determined based on locations corresponding to a plurality of servo wedges.

7. The method of claim 5, further comprising removing ITI data generated for each of the two or more fragments from the input sample of sequences.

8. The method of claim 1, further comprising generating ITI data associated with a second side track including by performing a correlation between the input sequence of samples and a sequence of data associated with the second side track.

9. The method of claim 8, further comprising removing the ITI data associated with the first side track and the ITI data associated with the second side track from the input sequence of samples.

10. The method of claim 1, wherein it is determined to remove the ITI data associated with the first side track in the event a maximum absolute value, associated with the set of correlation coefficients, exceeds a threshold.

11. The method of claim 1, wherein it is determined to remove the ITI data associated with the first side track in the event a function being maximized, which uses at least some correlation coefficients from the set, exceeds a threshold.

12. A system, comprising:
a processor configured to:
receive an input sequence of samples associated with a track on magnetic storage;
generate inter-track interference (ITI) data associated with a first side track including by performing a correlation between the input sequence of samples and a sequence of data associated with the first side track in order to produce a set of correlation coefficients;
use at least some correlation coefficients from the set to determine whether to remove the ITI data associated with the first side track from the input sequence of samples; and
in the event it is determined to not remove the ITI data associated with the first side track, not remove the ITI data associated with the first side track from the input sequence of samples; and
a memory coupled with the processor and configured to provide the processor with instructions.

13. The system of claim 12, wherein to generate ITI data includes generating a set of correlation coefficients and selecting a subset of the set of correlation coefficients.

14. The system of claim 13, wherein the selected subset of correlation coefficients is used to determine one or more of the following: (1) a relative phase offset between the track and the first side track or (2) a side track pulse-shape associated with the first side track.

15. The system of claim 12, wherein to generate ITI data associated with the first side track includes independently generating ITI data for each of two or more fragments associated with the first side track.

16. The system of claim 15, wherein the processor is further configured to remove ITI data generated for each of the two or more fragments from the input sample of sequences.

17. The system of claim 12, wherein it is determined to remove the ITI data associated with the first side track in the event a maximum absolute value, associated with the set of correlation coefficients, exceeds a threshold.

18. The system of claim 12, wherein it is determined to remove the ITI data associated with the first side track in the event a function being maximized, which uses at least some correlation coefficients from the set, exceeds a threshold.

19. A computer program product, the computer program product being embodied in a non-transitory computer readable medium and comprising computer instructions for:
receiving an input sequence of samples associated with a track on magnetic storage; and
generating inter-track interference (ITI) data associated with a first side track including by performing a correlation between the input sequence of samples and a sequence of data associated with the first side track in order to produce a set of correlation coefficients;

using at least some correlation coefficients from the set to determine whether to remove the ITI data associated with the first side track from the input sequence of samples; and in the event it is determined to not remove the ITI data associated with the first side track, not removing the ITI data associated with the first side track from the input sequence of samples.

20. The computer program product of claim 19, wherein it is determined to remove the ITI data associated with the first side track in the event a maximum absolute value, associated with the set of correlation coefficients, exceeds a threshold.

21. The computer program product of claim 19, wherein it is determined to remove the ITI data associated with the first side track in the event a function being maximized, which uses at least some correlation coefficients from the set, exceeds a threshold.

\* \* \* \* \*